United States Patent [19]

Schuermans

[11] Patent Number: 5,334,104
[45] Date of Patent: Aug. 2, 1994

[54] TRANSMISSION UNIT FOR MOTOR VEHICLES

[75] Inventor: Rafaël Schuermans, Maasmechelen, Belgium

[73] Assignee: VCST, naamloze vennootschap, Sint-Truiden, Belgium

[21] Appl. No.: 29,279

[22] Filed: Mar. 12, 1993

[30] Foreign Application Priority Data

Mar. 13, 1992 [BE] Belgium .............................. 09200253

[51] Int. Cl.⁵ ............................................. F16H 59/00
[52] U.S. Cl. ..................................................... 474/28
[58] Field of Search ................... 474/8, 11, 12, 16, 18, 474/28, 69, 70

[56] References Cited

U.S. PATENT DOCUMENTS 3,052,132 9/1962 Dittrich et al. .................. 74/230.17
3,782,213 1/1974 Rattunde .......................... 474/16 X
4,143,558 3/1979 van Deursen ................. 74/230.17 F
4,348,197 9/1982 Oliver .................................. 474/28
4,350,491 9/1982 Steuer ............................... 474/28 X
4,575,364 3/1986 Lamers ............................. 474/16

*Primary Examiner*—Thuy M. Bui
*Attorney, Agent, or Firm*—Foley & Lardner

[57] ABSTRACT

Transmission unit for motor vehicles, consisting of a continuously variable transmission (2); at least one hydraulic cylinder/piston unit (13) with a pressure cheer (15) co-operating with the continuously variable transmission (2); a pressure compensation chamber (22) co-operating with the above-mentioned pressure cheer (15); and a passage connection (26) connecting the pressure compensation chamber (22) with the pressure chamber (15), wherein a pressure-sensitive passage control member (28) is provided in the above-mentioned passage connection (26).

17 Claims, 2 Drawing Sheets

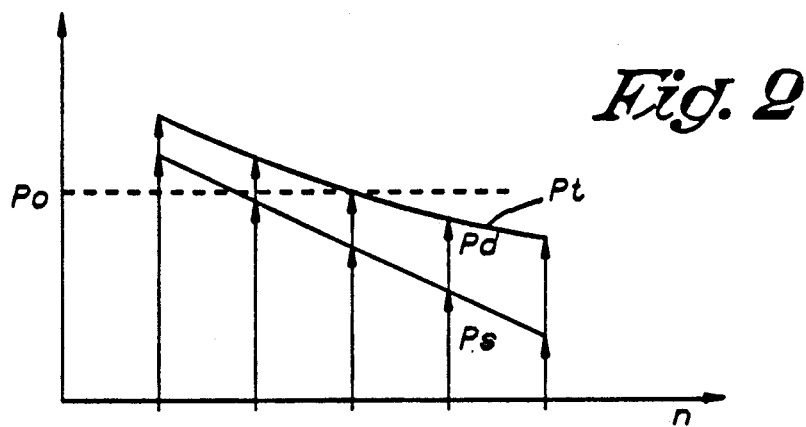
Fig. 2
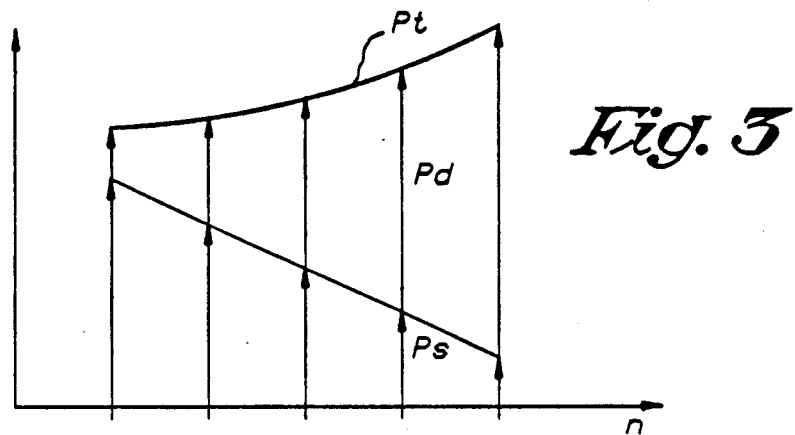
Fig. 3
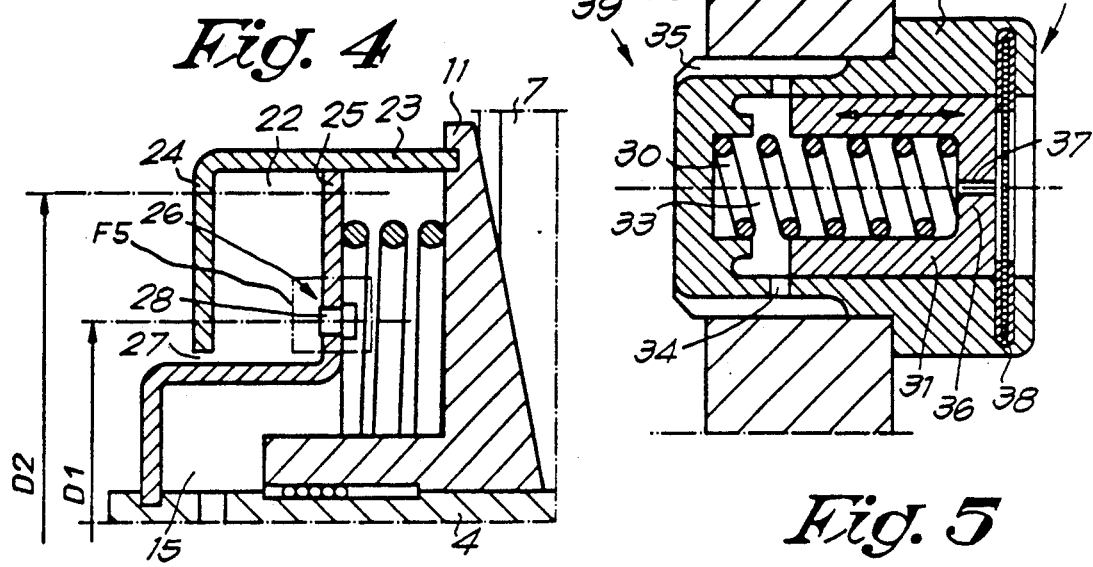
Fig. 4
Fig. 5

TRANSMISSION UNIT FOR MOTOR VEHICLES

BACKGROUND

Field of Invention

The present invention relates to a transmission unit for motor vehicles, and in particular to the type whereby the transmission ratio is regulated steplessly by means of a continuously variable transmission.

Description of the Related Art

Continuously variable transmission consists of two pulleys in between which an endless transmission element has been provided. The pulleys consist of conical pulley halves, one half of which can be axially moved such that the course radiuses of the transmission element on the pulleys can altered by moving the above-mentioned pulley halves.

The pulley halves are moved and/or pressed on by means of at least one cylinder/piston unit. In the pressure cheer of this cylinder/piston unit, a static pressure is provided to press on and/or move the corresponding pulley half. At high speeds, an unwanted centrifugal pressure is superposed on this static pressure.

In order to compensate for the centrifugal pressure, it is known to equip the above-mentioned transmission units with a pressure compensation cheer, which is connected to the above-mentioned pressure cheer via a passage connection, one and other such that on both sides of the piston of the cylinder/piston unit a pressure is built up.

According to a known embodiment, which amongst others has been described in EP-A1-0.128.611, the above-mentioned passage connection provides a permanent passage for the hydraulic medium. This is disadvantageous in that there is a constant fluid consumption, even when no compensation is required, namely at low speeds. Moreover, especially at low speeds the static pressure in the pressure cheer is usually highest, and consequently also the parasitic fluid consumption, in other words the fluid escaping via the above-mentioned passage connection.

This is in is turn disadvantageous in that because of the parasitic oil consumption, a relatively large pump delivery is required.

From NL-A-7513019 it is known to adjust the abovesaid passage. Herein the adjustment is carried out in the function of the mutual displacement of the pulleys or is carried out by means of a valve, in which the position of the valve body is determined by the centrifugal forces acting on it. A disadvantage hereby consists in that there is no direct relation between the width of the passage and the pressure in the pressure chamber, resulting in that said adjustment is not always optimal.

SUMMARY OF THE INVENTION

The present invention provides a transmission unit which does not have the above-mentioned disadvantages, or in which the above-mentioned disadvantages are at least restricted to a minimum.

To this end the invention concerns a transmission unit consisting of a continuously variable transmission; at least one hydraulic cylinder/piston unit with a pressure chamber co-operating with the continuously variable transmission; a pressure compensation cheer co-operating with the above-mentioned pressure cheer; and a passage connection connecting the pressure compensation cheer with the pressure chamber, characterized in that a pressure-sensitive passage control member is provided in the above-mentioned passage connection, which increasingly closes off the passage opening as the pressure in the pressure chamber increases. Preferably, in order to obtain an optimal effect, the passage control member is mounted on a small diameter, in other words closer to the inside diameter than to the outside diameter of the piston of the cylinder/piston unit.

The invention also concerns a transmission unit consisting of a continuously variable transmission; at least one hydraulic cylinder/piston unit with a pressure chamber co-operating with the continuously variable transmission; a pressure compensation chamber co-operating with the above-mentioned pressure chamber; and a passage connection connecting the pressure compensation chamber with the pressure chamber, characterized in that a pressure-sensitive passage control member is provided in the above-mentioned passage connection; that this passage control member is located on a large diameter, in other words closer to the outside diameter than to the inside diameter of the piston of the cylinder/piston unit; and that this passage control member is constructed such that, from a certain pressure in the pressure chamber, there is provided in an increasing passage as the pressure further increases, the latter in a progressive manner for the complete working range.

The pressure-sensitive passage control member according to the invention preferably consists of an independently working, spring-loaded valve.

The use of a pressure-sensitive passage control member is advantageous in that the connection between the pressure compensation chamber and the pressure chamber in the most unfavourable conditions is entirely or at least partially closed off, as a result of which parasitic fluid consumption is avoided or at least restricted.

BRIEF DESCRIPTION OF THE DRAWINGS

In order to better explain the characteristics according to the invention, hereafter some preferred embodiments are described by way of example only and without being limitative in any way, with reference to the accompanying drawings, in which:

FIGS. 2 and 3 are schematic representations of the pressure fluctuation in the pressure chamber of the transmission unit for two different locations;

FIG. 4 is a view on a larger scale of the part which is indicated in FIG. 4 by F4;

FIG. 5 is a section on a larger scale of the part which is indicated in FIG. 4 by F5.

DETAILED DESCRIPTION OF THE PREFERRED EMBODIMENTS

Figure 1:
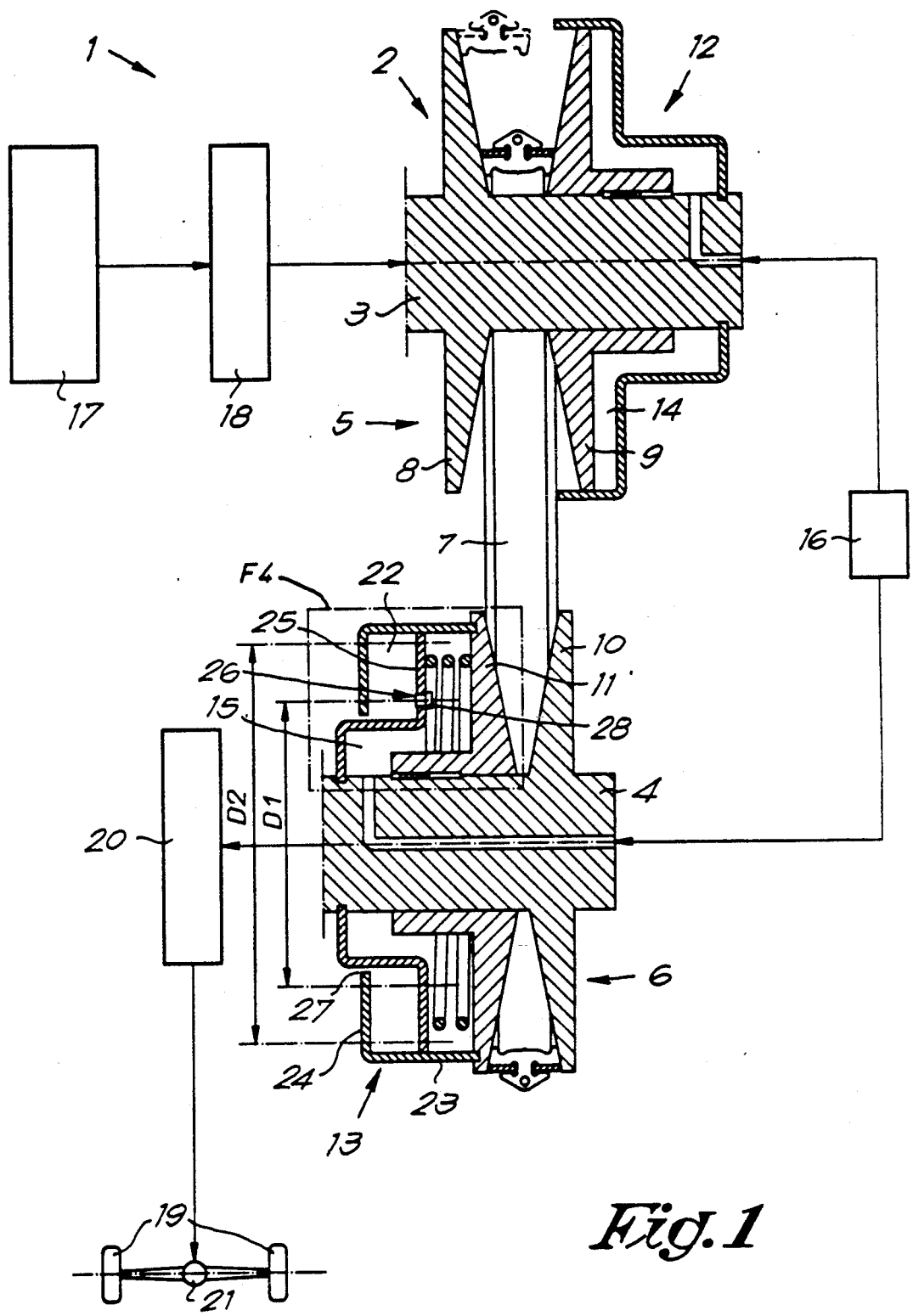
FIG. 1 is a schematic representation of a transmission unit according to the invention.

FIG. 1 shows a transmission unit 1 for motor vehicles, consisting of a continuously variable transmission 2 and means to alter the transmission ratio thereof.

The continuously variable transmission 2 mainly consists of an ingoing shaft 3, an outgoing shaft 4, two pulleys 5 and 6 which are mounted on the shafts 3 and 4 respectively and an endless transmission element 7, such as a belt. The pulleys 5 and 6 are composed of conical pulley halves 8-9 and 10-11, of which one pulley half 8, 10 respectively, cannot be axially moved and of which the second pulley 9, 11 respectively can be hydraulically moved in the axial direction.

The means to alter the transmission ratio consist cylinder/piston units 12 and 13, which co-operate with the moveable pulley halves 9 and 11 respectively. By supplying more or less hydraulic medium in the pressure chambers 14 and 15 of these cylinder/piston units 12 and 13, this by means of a suitable control unit 16, the transmission ratio can be altered.

The ingoing shaft 3 is driven as is known by the motor 17 of the vehicle, via a coupling and reversing unit 18. The outgoing shaft 4 provides for the drive of the wheels 19, via a transmission 20 and a differential 21.

The number of revolutions of the ingoing shaft 3 is practically never more than 6,000 revolutions per minute, and is less than 3,500 revolutions per minute for a large part of the operation. Hence, the centrifugal pressure which is generated in the pressure chamber 14 remains limited. The number of revolutions of the outgoing shaft 4 is often more than 3,500 revolutions per minute and often even more than 8,000 revolutions per minute, as a result of which the centrifugal pressure in the pressure chamber 15 becomes significant.

Hence, it is known to equip the transmission unit 2, and in particular the secondary pulley 6, with a pressure compensation chamber 22 to compensate increases of pressure which are generated as a result of centrifugal forces in the pressure chamber 15. This pressure compensation chamber 22 mainly consists of the continuation of the cylinder 23 of the cylinder/piston unit 13 and a deflector 24. Thus, the pressure compensation chamber 22 and the pressure chamber 15 are situated on both sides of the piston 25 and are connected by means of a passage connection 26. Any excess oil can escape from the pressure compensation chamber via a relatively wide opening 27.

When the above-mentioned passage connection 26 consists of a bore hole with a constant section, as is the case in the embodiment which is described in EP-A1-0.128.611, this is disadvantageous in that there is a continuous oil consumption, also When there is no need for compensation, namely at low speeds.

In order to remedy this disadvantage, according to the invention, an independently working pressure-sensitive passage control member 28 in the shape of a valve is provided in the passage connection 26, such that the loss of fluid is limited.

In order to obtain an optimal result, the specific construction of this passage control member 28 depends on the place where it is mounted in the piston 25. This will become clear from the curves in FIGS. 2 and 3.

On a small diameter D1, the pressure in the chamber 15 as a function of the speed has a course as shown in FIG. 2 for the major part of the operation. The static pressure Ps, or in other words the required clenching force which must be exerted on the transmission element 7, hereby decreases as the number of revolutions increases. The centrifugal forces on the diameter D1 are insignificant and the increase of the dynamic pressure Pd is smaller than the decrease of the static pressure Ps, such that the total pressure Pt has a decreasing course.

On a large diameter D2, the course of the static pressure Ps is analogous to that of the first case, but the increase of the dynamic pressure Pd is larger than the decrease of the static pressure Ps, such that the entire pressure Pt has an increasing course as shown in FIG. 3.

According to a first possibility, the passage control member 28 can be mounted in the piston 25 close to the shaft 4. In this case, the passage control member is designed such that it is closed or practically closed when the pressure Pt is high, and opens further as the pressure Pt decreases, such that at high speed, a compensation effect is obtained, whereas at low speed, the loss of fluid is restricted.

According to a second possibility, the passage control member 28 is mounted close to the outside perimeter of the piston 25. In this case, said passage control member is designed such that it is closed or practically closed when the pressure Pt is at its lowest point, and opens further as the pressure Pt increases, such that here also, at high speed, a compensating effect is ensured, whereas at low speed, when no compensation is required, the loss of fluid is restricted.

The mounting and design of a passage control member 28 according to the first possibility is explained below by means of FIGS. 4 and 5.

Hereby, as shown in FIG. 4, use is made of a passage control member 28 which is mounted on a small diameter D1 in the piston 25, in other words closer to the inside diameter of the piston 25 than to the outside diameter, wherein this passage control member 28 is constructed in such a manner that it increasingly closes off the passage opening of the passage connection 26 as the pressure in the pressure cheer 15 increases.

As shown in FIG. 5, the passage control member 28 mainly consists of a housing 29 and a valve body 31 loaded by means of elastic means, such as a spring 30, which can be shifted in the housing 29. The housing 29 is made in the form of a cylinder-shaped plug which is provided with a bore hole in the side 32 which ends in the pressure chamber 15, forming a chamber 33 in which the valve body 31 can be moved. The chamber 33 is connected to the pressure compensation chamber 22 by means of at least one radial passage 34 provided in the housing 29 and an axial recess 35.

The valve body 31 consists of a hollow, piston-shaped element which is provided with a narrow passage 37 in its head face 36.

At the entry of the chamber 33, a sieve or filter 38 has been provided, which also confines the movement of the valve body 31.

The working of the passage control member 28 of FIG. 5 can be easily derived from this figure. When there is no difference in pressure between the sides 32 and 39, the valve body 31 is pressed against the filter 38 as a result of the spring force. At an increased difference in pressure, whereby the pressure in the pressure chamber 15 is higher than in the pressure compensation chamber 22, fluid flows through the passage 37, over which a pressure drop is caused. As soon as this pressure drop exceeds a certain value, the valve body 31 will move against the pressure of the spring 30, and the passages 34 are throttled. Hereby, an equilibrium is brought about whereby the valve body 31 assumes a certain position, depending of the pressure drop in the passage 37.

For the sake of completeness it should be noted that there is a pressure drop both over the passage 34 and the passage 37. The pressure drop over the passage 37 increases as the total pressure drop increases. On a small diameter, the total pressure drop, in other words the difference between the pressure in the pressure chamber 15 and the pressure in the pressure compensation chamber 22 is equal or almost equal to the above-mentioned total pressure Pt. Hence, the pressure drop over the passage 37 is proportional to the pressure Pt.

In the application of FIG. 4, and in the corresponding curve of FIG. 2, the latter implies that the passage control member 28 at a total pressure Pt which is lower than a certain value Po, is entirely opened, whereas at a higher value of the pressure Pt, the passage control member 28 provides for a partial closing off. As a result, high parasitic fluid losses at low speeds can be avoided.

The value Po and the magnitude of the movement of the valve disc 31 as a function of the pressure drop over this valve disc 31 depend on the pre-tension and the spring constant of the spring 30. Hence, the properties of the passage control member 28 can be altered by using a spring with other characteristics.

It is clear that a pressure-sensitive passage member may also be mounted on the diameter D2 instead of on D1. As can be derived from FIG. 3, in this case, in order to obtain the effect envisaged by the invention, this passage control member should be designed such that when the pressure Pt has a low value, the passage is closed or practically closed, and opened or opened further at higher values, such that at low speeds, when no compensation is required, the supply of fluid in the pressure compensation chamber 15 is avoided or restricted.

The embodiment whereby the passage control member 28 is mounted on a small diameter D1 is however preferred as this provokes the least parasitic losses.

According to the invention, in both of the abovesaid possibilities, preferably, a pressure-sensitive passage control member 28 will be used, being constructed in such a way that the parts of it which determine the width of the passage connection 26 are not subjected to centrifugal forces intervening in the movement of the passage control member 28. Preferably, to this end a valve body will be used which is axial movable in relation to the axes of rotation of the transmission 2.

Preferably, the opening, respectively the closing of the passage connection 26, will occur progressively over the complete working range. The latter means that, in the first case described above, in other words in the embodiments in which there is provided an increasing closing off of the opening of the passage when the pressure in the pressure chamber 15 is increasing, the curve, in which the opening of the passage connection 26 is represented in the ordinate, and in which the pressure in the pressure chamber 15 is represented in the abscissa, shows an inclination Gradient which for each point of said curve and for the complete working range of the transmission is smaller or equal to zero. On the other hand, for the second case, in other words in the embodiments in which there is provided an increasing opening of the passage when the pressure in the pressure chamber 15 is increasing, the said curve shows an inclination Gradient which is Greater or equal to zero.

Even more preferable, however not necessary, the aforesaid curves show a descending, and respectively ascending course, which extends over at least 75% of the working range, and even better over the complete working range.

The present invention is in no way limited to the embodiments described by way of example and shogun in the accompanying drawings; on the contrary, such a transmission unit for motor vehicles can be made in various variants while still remaining within the scope of the invention.

I claim:

1. Transmission unit for motor vehicles comprising: a continuously variable transmission; at least one hydraulic cylinder/piston unit with a pressure chamber co-operating with the continuously variable transmission; a pressure compensation chamber co-operating with the pressure chamber; a passage connection connecting the pressure compensation chamber with the pressure chamber; and a pressure-sensitive passage control member provided in the passage connection, the pressure-sensitive passage control member increasingly closing off a passage opening of the passage connection as pressure in the pressure chamber increases.

2. Transmission unit according to claim 1, characterized in that the passage control member is mounted on a small diameter (D1), in other words closer to the inside diameter than to the outside diameter of a piston of the cylinder/piston unit.

3. Transmission unit according to claim 1, characterized in that the pressure-sensitive passage control member (28) consists of an independently working spring-loaded valve.

4. Transmission unit according to claim 1, wherein the passage control member is constructed such that adjustment of the passage opening occurs progressively.

5. Transmission unit according to claim 4, wherein the passage control member is constructed such that the closing off of the passage opening increases over at least 75% of a working range.

6. Transmission unit according to claim 5, wherein the closing off of the passage opening increases over 100% of the working range.

7. Transmission unit according to claim 1, characterized in that the passage control member is provided with a valve having a valve body, and wherein the valve body can move only axially.

8. Transmission unit according to claim 1, characterized in that the passage control member includes a housing with a radial passage, a valve body cooperating with the radial passage and elastic means which force the valve body in an opened position.

9. Transmission unit according to claim 8, characterized in that the valve body is made in the shape of a piston and is provided with a narrow passage in a head face of the piston, the narrow passage being in communication with the pressure chamber.

10. Transmission unit according to claim 8, characterized in that the housing is made in the form of a cylinder-shaped plug.

11. Transmission unit according to claim 8, further comprising a filter and wherein the housing on a side thereof which is directed towards the pressure chamber is open, and the filter is provided on the open side.

12. Transmission unit for motor vehicles, consisting of a continuously variable transmission; at least one hydraulic cylinder/piston unit with a pressure chamber cooperating with the continuously variable transmission; a pressure compensation chamber cooperating with the pressure chamber; and a passage connection connecting the pressure compensation chamber with the pressure chamber (15), characterized in that a pressure-sensitive passage control member is provided in the passage connection; the passage control member is located on a large diameter (D2), in other words closer to the outside diameter than to the inside diameter of the piston of the cylinder/piston unit; and that the pressure-sensitive passage control member is constructed such that, from a certain pressure in the pressure chamber, there is provided an increasing passage opening of the passage connection as pressure in the pressure chamber increases beyond the certain pressure, the increasing passage opening occurring in a progressive manner for a complete working range.

13. Transmission unit according to claim 12, characterized in that the pressure-sensitive passage control member consists of an independently working spring-loaded valve.

14. Transmission unit according to claim 12, wherein the pressure-sensitive passage control member is constructed such that the further opening of the passage opening increases over at least 75 t of the working range.

15. Transmission unit according to claim 14, wherein the further opening of the passage opening increases over 100% of the working range.

16. Transmission unit according to claim 12, characterized in that the pressure-sensitive passage control member is provided with a valve having a valve body, and wherein the valve body can move only axially.

17. Transmission unit according to claim 1, wherein the hydraulic piston unit includes a piston and the passage connection is a through opening in the piston.

* * * * *